United States Patent [19]
Derr

[11] Patent Number: 5,577,579
[45] Date of Patent: Nov. 26, 1996

[54] METHOD OF MANUFACTURING A SUSPENSION DAMPER

[75] Inventor: Randall L. Derr, Bellbrook, Ohio

[73] Assignee: General Motors Corporation, Detroit, Mich.

[21] Appl. No.: 550,138

[22] Filed: Oct. 30, 1995

[51] Int. Cl.$^6$ ........................................... F16F 9/48
[52] U.S. Cl. .................. 188/315; 188/288; 188/322.19; 29/436
[58] Field of Search ................ 188/315, 322.19, 188/322.16, 322.22, 322.15, 288, 316, 281, 282, 318; 29/436, 434

[56] References Cited

U.S. PATENT DOCUMENTS

| | | | |
|---|---|---|---|
| 3,062,331 | 11/1962 | Wyman | 188/288 |
| 3,985,190 | 10/1976 | Kammerer et al. | 188/288 |
| 4,109,767 | 9/1978 | Nandyal et al. | 188/315 |
| 4,392,293 | 7/1983 | Yamaguchi et al. | 29/436 |
| 4,443,926 | 4/1984 | Pearson et al. | 29/436 |
| 4,768,629 | 9/1988 | Wössner | 188/322.14 |
| 4,819,770 | 4/1989 | Hahn | 188/288 |
| 4,971,181 | 11/1990 | Zaengleih et al. | 29/436 |

FOREIGN PATENT DOCUMENTS

| | | | |
|---|---|---|---|
| 1056323 | 2/1952 | France | 188/288 |
| 969377 | 7/1949 | Germany | 188/288 |
| 3-272338 | 12/1991 | Japan | 188/315 |

*Primary Examiner*—Douglas C. Butler
*Attorney, Agent, or Firm*—Jeffrey A. Sedlar

[57] ABSTRACT

A suspension damper and a method of manufacturing a suspension damper so that a common cylinder end assembly is used with dampers having cylinder tubes of varying diameters to accommodate piston assemblies having various desirable performance characteristics resulting from the specific diameter thereof. This provides a way of varying the cylinder tube to suit the specifically selected piston assembly while reducing component part proliferation of the complicated cylinder end assembly part of the damper.

5 Claims, 3 Drawing Sheets

METHOD OF MANUFACTURING A SUSPENSION DAMPER

BACKGROUND OF THE INVENTION

The present invention relates to suspension dampers of the types commonly known as shock absorbers and struts and to a method of manufacturing related thereto. More particularly, the invention relates to a means for providing suspension dampers of various performance characteristics while minimizing component part proliferation.

Suspension dampers of the shock absorber and strut type are known wherein an inner tube, known as a cylinder tube, carries a reciprocating valved piston assembly. The piston assembly is connected to a piston rod which extends out of the cylinder tube. The cylinder tube is centered within an outer tube, known as a reservoir tube, by a valved cylinder end assembly which engages a base cup. The basecup closes the bottom of the reservoir tube. The end of the damper opposite from the base cup is closed by a rod guide assembly and seal assembly. The cylinder and reservoir tubes carry a supply of hydraulic fluid which is forced through valves in the piston assembly and cylinder end assembly as the damper cycles in response to vehicle suspension travel.

The performance characteristics of this known type of damper are varied by altering the valves and the flow passages through the piston assembly and cylinder tube end assembly and additionally, by varying the diameter of the piston. When the piston size is changed it necessitates an accommodating change in the diameter of the cylinder tube, the cylinder tube end assembly and additionally, requires changes to the base cup. This results in the proliferation of vast numbers of individual component parts to produce damper assemblies of various performance characteristics.

SUMMARY OF THE INVENTION

It is the aim of the present invention to reduce the proliferation of individual damper component parts while providing damper assemblies of various performance characteristics. In furtherance of this goal it has been recognized that the piston assembly itself must vary in size in order to achieve various desirable performance characteristics. It has been found that desirable performance variation results can be achieved without changing the size of the cylinder tube end assembly. Accordingly, having discovered these attributes it is an aspect of the present invention to provide a damper assembly of various performance characteristics by changing the diameter of the piston while maintaining a constant diameter and construction of the cylinder tube end assembly. This aspect is achieved by selecting cylinder tubes having various operative diameters to mate with the variable diameter of the piston assembly and forming the ends of the cylinder tubes to mate with the constant diameter cylinder end assembly.

An advantageous result is that piston and cylinder tube pairs having a range of diameters and therefore, various desirable performance characteristics are assembleable in various dampers with a common cylinder end assembly design. Cylinder tubes with diameters greater than, equal to and less than the diameter of the cylinder tube end assembly are used with one common size cylinder tube end assembly. This reduces the number of individual component parts that are required to provide a portfolio of damper assemblies having various performance characteristics.

A method of manufacturing a suspension damper so that a common cylinder tube end assembly is usable with cylinder tubes and pistons of varying diameters includes forming a range of cylinder tube sizes including cylinder tubes with diameters equal to that of the cylinder tube end assembly and those with diameters greater than or less than that of the cylinder tube end assembly. The specific diameters of the cylinder tubes are selected to mate with the piston assemblies which have operative diameters designed to achieve desirable performance characteristics. The ends of the cylinder tubes with diameters greater than the cylinder tube end assembly are formed to a reduced diameter sufficient to mate with the cylinder tube end assembly. The cylinder tubes with diameters less than the diameter of the cylinder tube end assembly are processed so that their ends are expanded outwardly to mate with the cylinder tube end assembly. The present invention provides this approach to damper part commonization wherein the complicated and more costly part: the cylinder tube end assembly, is common among the various damper assemblies, while the relatively simple and less expensive part: the cylinder tube, is provided in various sizes to suit the piston assembly size.

DETAILED DESCRIPTION OF THE PRESENTLY PREFERRED EMBODIMENTS

Figure 1:
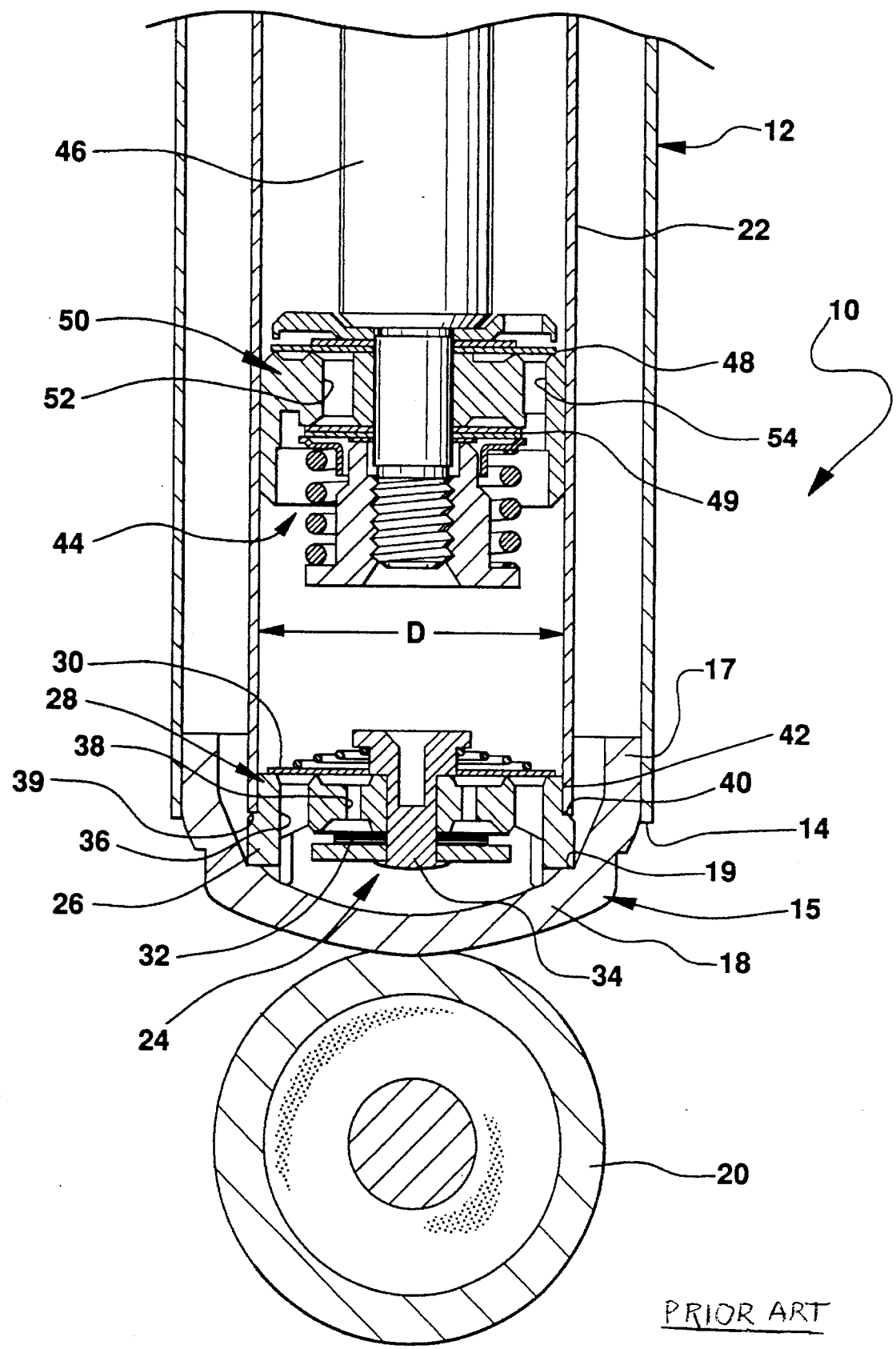
FIG. 1 is a fragmentary cross-sectional illustration of a suspension damper having a cylinder tube with a diameter substantially equal to the diameter of the cylinder tube end assembly.

Referring to the drawings, illustrated in FIG. 1 are the operative elements of a suspension damper 10 of most relevance to the present invention. Damper 10 includes a cylindrical reservoir tube 12 with an end 14 closed by base cup 15. The base cup 15 includes an annular leg 17 and a domed wall 18. The interior of the base cup 15 includes an annular ledge designated as 19. A mounting element 20 is secured to the exterior of the base cup 15 and provides a means for mounting the damper 10 to a vehicle suspension element (not illustrated).

A cylinder tube 22 is carried within reservoir tube 12 and is maintained in a centered position by means of engagement with cylinder end assembly 24. Cylinder end assembly 24 includes an annular leg 26 which is seated on annular ledge 19 of base cup 15. Cylinder end assembly 24 also includes a base wall 28. Base wall 28 includes an intake valve assembly 30 and a compression valve assembly 32 which are carried thereon by a fastener 34. Intake flow passages 36 and compression flow passages 38 extend through base wall 28 of cylinder end assembly 24. The cylinder end assembly 24 also includes an annular seat 40 with an adjacent annular vertical wall 42 having an outer diameter substantially equal to D. By way of example, D is 32 mm in the present embodiment.

The diameter D is specifically, the operative diameter of the piston assembly 44 which is slidably carried in the cylinder tube 22. Piston assembly 44 includes a compression valve assembly 48 and a rebound valve assembly 49. The piston assembly 44 also includes a piston plate 50 with compression flow passages 54 and rebound flow passages 52 extending therethrough. The piston assembly 44 is engaged by a piston rod 46 which extends through the cylinder tube 22.

The operative diameter D of the piston assembly 44 is selected to achieve desired performance characteristics. The performance characteristics of the damper 10 are specifically tuned by selecting appropriate piston valves 48 and 49 and the base valves 30 and 32. For convenience of assembly, the cylinder tube 22 engages the annular vertical wall 42 of the cylinder end assembly 24 which has an outer diameter also substantially equal to D. The end 39 of cylinder tube 22 engages the annular seat 40.

Figure 2:
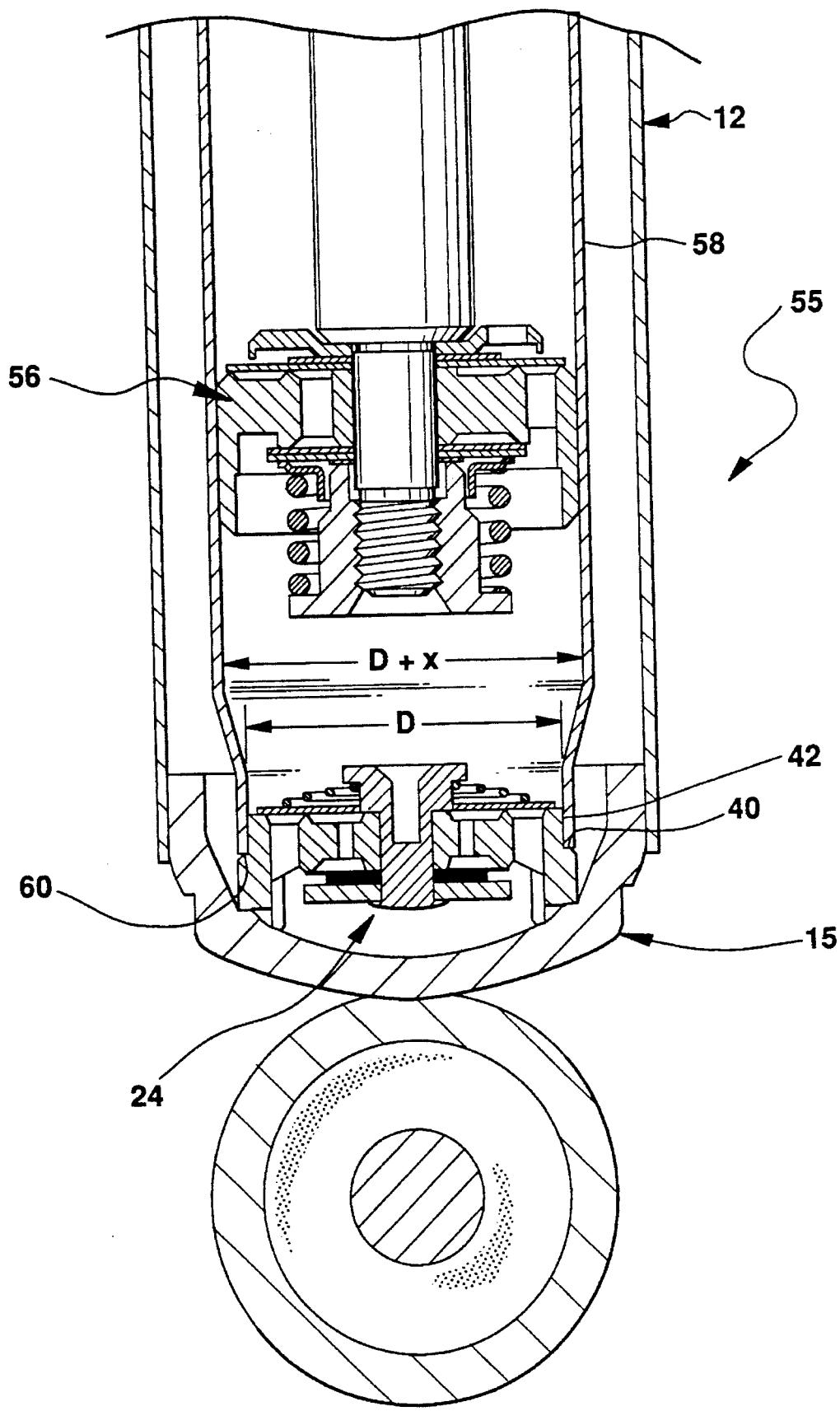
FIG. 2 is a fragmentary cross-sectional illustration of a suspension damper having a cylinder tube with a diameter greater than the diameter of the cylinder tube end assembly.

Referring to FIG. 2, a damper 55 includes a piston assembly 56 which has an operative diameter greater than D and is designated as D+X. The piston assembly 56 is therefore, slidably carried in a cylinder tube 58 which also has a corresponding diameter greater than D. The diameter of the piston assembly 56 is specifically selected to achieve a desirable performance characteristic in the damper 55. By way of example the diameter D+X is 35 mm in the present embodiment.

In the damper 55, the piston assembly 56 and cylinder tube 58 are used with the same reservoir tube 12, base cup 15 and cylinder end assembly 24 as were used in the damper 10 of FIG. 1. The cylinder end assembly 24 includes annular seat 40 and adjacent annular vertical wall 42 which has an outer diameter substantially equal to D.

In order to assemble the cylinder tube 58 to the cylinder end assembly 24, the end 60 of cylinder tube 58 is formed in a necked down fashion by means of a technique such as through use of a simple ring die and press to reduce the larger operative diameter D+X of the cylinder tube 58 down to a diameter substantially equal to D at the end 60. Accordingly, the damper 55 of FIG. 2 achieves different performance characteristics than the damper 10 of FIG. 1 by having a different sized piston while utilizing a common base cup 15, cylinder end assembly 24 and reservoir tube 12.

Figure 3:
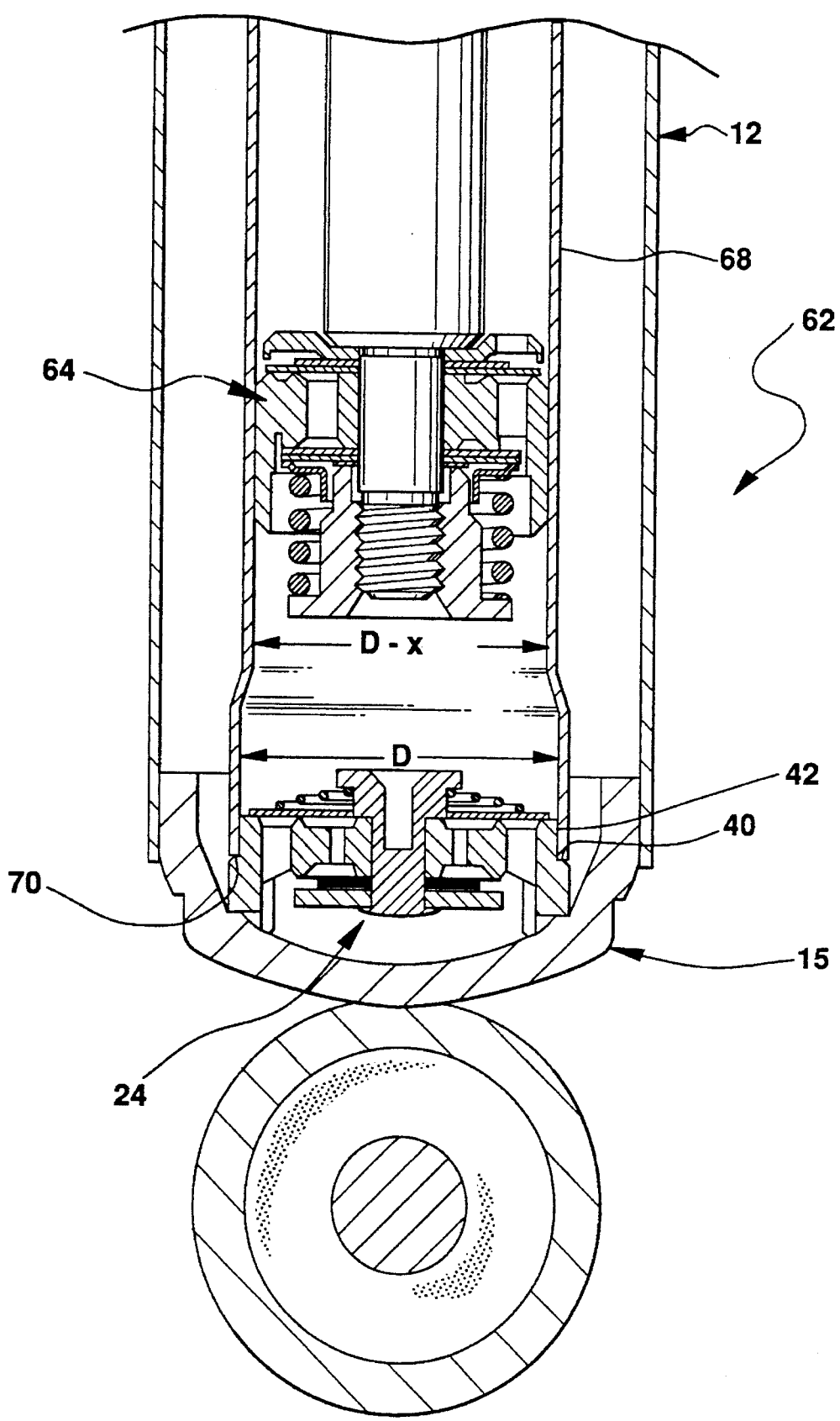
FIG. 3 is a fragmentary cross-sectional illustration of a suspension damper having a cylinder tube with a diameter less than the diameter of the cylinder tube end assembly.

Referring to FIG. 3, a damper 62 is illustrated which includes a piston assembly 64 with an operative diameter less than D and designated as D−X. The diameter of the piston assembly 64 is selected to achieve specifically desirable performance characteristics from the damper 62. The piston assembly 64 is slidably carried in a cylinder tube 68 which has a mating diameter corresponding to the diameter of the piston assembly 64. By way of example, the diameter D−X is 28 mm in the present embodiment.

The damper 62 includes a reservoir tube 12, base cup 15 and cylinder end assembly 24 in common with the damper 10 of FIG. 1 and the damper 55 of FIG. 2. Optionally, as the diameter D−X significantly diverges from the diameter D, a reservoir tube and base cup of smaller diameter may be utilized. However, in accordance with the present invention, the cylinder end assembly 24 remains common.

In order to mate the cylinder tube 68 with the annular seat 40 and adjacent annular vertical wall 42, which has an outer diameter substantially equal to D, the end 70 is formed in a flared out fashion by means of a technique such as using an arbor and press to enlarge the cylinder tube 68 at the end 70 to a diameter substantially equal to D. Accordingly, a damper 62 with performance characteristics differing from both the damper 10 of FIG. 1 and the damper 55 of FIG. 2 is provided with the same cylinder end assembly 24.

By means of the foregoing a method of manufacturing suspension dampers having various performance characteristics is provided while utilizing a common cylinder end assembly. This is achieved by varying the diameter of the cylinder tube to match the diameter of the piston assembly, which is selected to achieve desirable performance characteristics, while maintaining the size of the cylinder end assembly. Therefore, the relatively easily varied cylinder tube is changed to mate with the piston assembly, while the construction of the more complicated cylinder end assembly remains constant.

What is claimed is:

1. A method of manufacturing suspension dampers that include a cylinder tube having an end, a cylinder end assembly with an annular seat and an adjacent annular wall having an outer diameter D and a piston slidably carried in the cylinder tube, so that a common cylinder tube end assembly is used with cylinder tubes of varying diameters comprising the steps of:

a. selecting the cylinder tubes with operative diameters greater than D and forming the ends thereof to have an inner diameter substantially equal to D;

b. selecting the cylinder tubes with operative diameters less than D and forming the ends thereof to have an inner diameter substantially equal to D;

c. selecting cylinder tubes with operative diameters equal to D with ends having inner diameters substantially equal to D;

d. selecting the cylinder tube end assembly with an annular seat and an adjacent annular wall having an outer diameter D; and e. assembling any one of the cylinder tubes in steps a–c to the cylinder tube end assembly selected in step d so that the cylinder tube end assembly is assembled to any one of the cylinder tubes with operative diameters greater than D, less than D and equal to D.

2. A method of manufacturing suspension dampers according to claim 1 wherein the suspension dampers include reservoir tubes and base cups and further comprising the steps of:

assembling the base cups to the reservoir tubes; and inserting the assembled cylinder tube and the cylinder tube end assembly into one of the assembled base cups and reservoir tubes.

3. A method of manufacturing suspension dampers so that a common cylinder tube end assembly is assembled with cylinder tubes and mating piston assemblies of varying diameters comprising the steps of:

a. assembling a set of cylinder tube end assemblies each including an intake valve assembly and a compression valve assembly and each cylinder tube end assembly of the set of cylinder tube end assemblies having an annular wall defining a common diameter wherein the common diameter is constant for the set of cylinder tube end assemblies;

b. forming cylinder tubes in a range of sizes including a first set of cylinder tubes with operative diameters equal to the common diameter of the set of cylinder tube end assemblies wherein the first set of cylinder tubes have ends sized to mate with the annular walls of the cylinder tube end assemblies, a second set of cylinder tubes with operative diameters greater than the common diameter of the set of cylinder tube end assemblies and a third set of cylinder tubes with operative diameters less than the common diameter of the set of cylinder tube end assemblies wherein the operative diameters of the first, second and third sets of cylinder tubes are selected to mate with piston assemblies having operative diameters designed to achieve desirable performance characteristics;

c. forming the second set of cylinder tubes with reduced diameter ends so that the reduced diameter ends are sized to mate with the annular walls of the cylinder tube end assemblies;

d. forming the third set of cylinder tubes with enlarged diameter ends so that the enlarged diameter ends are sized to mate with the annular walls of the cylinder tube end assemblies;

e. assembling one of the set of cylinder tube end assemblies assembled in step a, to each cylinder tube of the first, second and third sets of cylinder tubes formed in steps b–d; and f. inserting a piston assembly into the cylinder tube.

4. A method of manufacturing suspension dampers according to claim 3 further comprising assembling the piston assemblies so that each carries compression and rebound valve assemblies and wherein when assembled into one of the cylinder tubes the piston assembly is slidable only through a segment of the cylinder tube wherein the operative diameter is constant and the piston assembly is in constant sealing engagement with the cylinder tube.

5. A method of manufacturing suspension dampers each suspension damper having a reservoir tube with an end closed by a base cup, a cylinder tube end assembly, a cylinder tube having an end engaged with the cylinder tube end assembly and a piston having an operative diameter slidably carried in the cylinder tube comprising the steps of:

a. assembling a set of cylinder tube end assemblies each including an intake valve assembly and a compression valve assembly and each cylinder tube end assembly of the set of cylinder tube end assemblies having an annular wall defining a common diameter wherein the common diameter is constant for the set of cylinder tube end assemblies;

b. assembling a set of pistons wherein the set of pistons includes pistons with operative diameters greater than the common diameter of the cylinder tube end assemblies, pistons with operative diameters equal to the common diameter of the cylinder tube end assemblies and pistons with operative diameters less than the common diameter of the cylinder tube end assemblies wherein the operative diameter of each piston is designed to achieve desirable performance characteristics;

c. forming the cylinder tubes in a range of sizes including a first set of cylinder tubes with operative diameters equal to the common diameter of the set of cylinder tube end assemblies sized to slidably carry the pistons with operative diameters equal to the common diameter wherein the first set of cylinder tubes have ends sized to mate with the annular walls of the cylinder tube end assemblies, a second set of cylinder tubes with operative diameters greater than the common diameter of the set of cylinder tube end assemblies sized to slidably carry the pistons with operative diameters greater than the common diameter and a third set of cylinder tubes with operative diameters less than the common diameter of the set of cylinder tube end assemblies sized to slidably carry the pistons with operative diameters less than the common diameter;

d. forming the second set of cylinder tubes with reduced diameter ends so that the reduced diameter ends are sized to mate with the annular walls of the cylinder tube end assemblies;

e. forming the third set of cylinder tubes with enlarged diameter ends so that the enlarged diameter ends are sized to mate with the annular walls of the cylinder tube end assemblies;

f. assembling one of the set of cylinder tube end assemblies assembled in step a, to any one cylinder tube of the first, second and third set of cylinder tubes formed in steps b–d; and g. inserting the cylinder tube end assembly and cylinder tube assembled in step e into the reservoir tube with an end closed by a base cup so that the cylinder tube end assembly engages the base cup centering the cylinder tube in the reservoir tube.

\* \* \* \* \*